(12) United States Patent
Neese

(10) Patent No.: US 8,120,196 B1
(45) Date of Patent: Feb. 21, 2012

(54) WAVE-POWERED WATER WHEEL TYPE GENERATOR

(76) Inventor: Stephen L. Neese, Anchorage, AK (US)

( * ) Notice: Subject to any disclaimer, the term of this patent is extended or adjusted under 35 U.S.C. 154(b) by 1576 days.

(21) Appl. No.: 11/231,030

(22) Filed: Sep. 20, 2005

(51) Int. Cl.
| F03B 13/00 | (2006.01) |
| H02P 9/04 | (2006.01) |
| F03B 13/10 | (2006.01) |
| F03B 13/12 | (2006.01) |
| B63H 3/00 | (2006.01) |

(52) U.S. Cl. .............................. 290/54; 290/53; 416/119
(58) Field of Classification Search ............... 290/53, 290/54; 416/119
See application file for complete search history.

(56) References Cited

U.S. PATENT DOCUMENTS

| 4,517 | A | * | 5/1846 | Hand ............................... 416/86 |
| 4,843 | A | * | 11/1846 | Rowand ........................ 415/3.1 |
| 98,891 | A | * | 1/1870 | Sory ............................. 416/119 |
| 113,284 | A | * | 4/1871 | Folsom ......................... 416/119 |
| 203,382 | A | * | 5/1878 | Smith ........................... 416/117 |
| 226,357 | A | * | 4/1880 | Saccone ....................... 416/119 |
| 302,769 | A | * | 7/1884 | Pallausch ..................... 416/119 |
| 646,712 | A | * | 4/1900 | Symons ........................ 416/86 |
| 998,446 | A | * | 7/1911 | Amy ............................. 416/142 |
| 1,576,584 | A | * | 3/1926 | Erdmann ...................... 416/119 |
| 1,576,641 | A | * | 3/1926 | Beekley ....................... 416/119 |
| 2,097,286 | A | * | 10/1937 | McGee .......................... 290/54 |
| 2,428,515 | A | * | 10/1947 | Courson ....................... 416/119 |
| 3,758,083 | A | * | 9/1973 | Palmer ........................... 261/25 |
| 3,773,434 | A | * | 11/1973 | Mason ......................... 416/119 |
| 3,897,170 | A | * | 7/1975 | Darvishian ................... 416/119 |
| 3,922,012 | A | * | 11/1975 | Herz ............................... 290/43 |
| 3,928,771 | A | * | 12/1975 | Straumsnes ..................... 290/43 |
| 4,001,596 | A | * | 1/1977 | Kurtzbein ....................... 290/53 |
| 4,039,849 | A | * | 8/1977 | Mater et al. ..................... 290/55 |
| 4,095,422 | A | * | 6/1978 | Kurakake ........................ 60/398 |
| 4,104,536 | A | * | 8/1978 | Gutsfeld ......................... 290/54 |
| 4,203,707 | A | * | 5/1980 | Stepp ............................ 416/119 |
| 4,253,795 | A | * | 3/1981 | McQueen ..................... 415/125 |
| 4,383,797 | A | * | 5/1983 | Lee ................................... 415/7 |
| 4,421,461 | A | * | 12/1983 | Hicks et al. ..................... 417/53 |
| 4,424,451 | A | * | 1/1984 | Schmidt ......................... 290/54 |
| 4,512,886 | A | * | 4/1985 | Hicks et al. ............. 210/170.05 |
| 4,679,985 | A | * | 7/1987 | Worms ......................... 416/119 |
| 4,684,817 | A | * | 8/1987 | Goldwater ..................... 290/55 |
| 4,776,762 | A | * | 10/1988 | Blowers, Sr. ................. 416/119 |
| 5,051,059 | A | * | 9/1991 | Rademacher .................... 415/7 |
| 5,098,264 | A | * | 3/1992 | Lew ............................... 418/23 |
| 5,844,323 | A | * | 12/1998 | Hung ............................. 290/54 |
| 6,006,518 | A | * | 12/1999 | Geary ............................. 60/398 |
| 6,019,305 | A | * | 2/2000 | Palliser ......................... 242/374 |
| 6,499,939 | B2 | * | 12/2002 | Downing ...................... 415/3.1 |
| 6,734,576 | B2 | * | 5/2004 | Pacheco ......................... 290/55 |

(Continued)

Primary Examiner — Pedro J Cuevas
(74) Attorney, Agent, or Firm — Michael J. Tavella

(57) ABSTRACT

A Styrofoam-filled plastic cylinder that has collapsible paddle wheel fins attached about the circumference. Two shafts extend from the ends of the cylinder. The shafts are held by bearings. The bearings are attached to a frame structure that is embedded into the seabed. The shafts then extend past the bearings and are connected to a gear drive system that, in turn, connected to generators or other mechanical devices. When installed in the sea, the cylinder will turn in the swells/tidal action for as long as the ocean produces waves. Platforms on either side of the cylinder rise and fall with tidal action to maintain effective contact with the water at all times. Moreover, because the structure is positioned at or near the water surface, maintenance is much simpler for this device.

3 Claims, 5 Drawing Sheets

U.S. PATENT DOCUMENTS 6,853,096 B1 * 2/2005 Yu et al. .......................... 290/55
6,930,406 B2 * 8/2005 Montgomery .................. 290/42
2005/0017513 A1 * 1/2005 Sipp ................................ 290/54
2005/0099010 A1 * 5/2005 Hirsch ............................ 290/42

* cited by examiner

WAVE-POWERED WATER WHEEL TYPE GENERATOR

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to a wave-powered generator and particularly to a wave powered generator using a lightweight paddle wheel configuration.

2. Description of the Prior Art

Water-powered generators have been in use for centuries, going back to the old waterwheels used to power mills. For example, U.S. Pat. No. 647,638 shows a wave motor that has a number of buckets placed on an ovular path. This is set in the surf and is driven by wave action. The movement of the buckets is used to drive a motor or similar device. U.S. Pat. No. 889,153 teaches a current motor that is placed in a tidal current and power is produced as the device is turned by the movement of the currents.

In recent years, a surge of interest in using tidal surges and wave action to generate power has grown. Many modern wave-operated systems use floats attached to reciprocating devices that rise and fall with the ocean swells. These in turn, drive generators to produce power. For example, U.S. Pat. No. 3,965,364 shows such a device. U.S. Pat. No. 4,516,033 teaches a modern version of the water wheel. Here a number of wheels are paced aside a barge. As the water moves past the barge, the wheels turn. The movements are interconnected to drive a generator. Although these devices work, they require considerable surface area to lay out the pattern of floats to generate sufficient power. Moreover, they require anchoring systems for all of the floats. Finally, the number of machines creates a large maintenance burden.

BRIEF DESCRIPTION OF THE INVENTION

The instant invention overcomes these problems. It is a Styrofoam-filled plastic cylinder that has collapsible paddle wheel fins attached about the circumference. A shaft runs through the cylinder and extends from the two ends. The shafts are held by bearings. The bearings are attached to a frame structure that is embedded into the seabed. The frame has supports that are designed to move up and down with the flow of the tide to keep the cylinder at the mean water level at any given time. The shafts then extend past the bearings and are connected to a generator, or, if necessary, to a gear drive system that, in turn, connected to generators or other mechanical devices.

When installed in the sea, the cylinder will turn in the swells/tidal action for as long as the ocean produces waves. Moreover, because the structure is positioned at or near the water surface, maintenance is much simpler for this device.

It is an object of this invention to produce a wave-powered generator that is lightweight, and operates at or near the surface of the ocean.

DETAILED DESCRIPTION OF THE INVENTION

Figure 1:
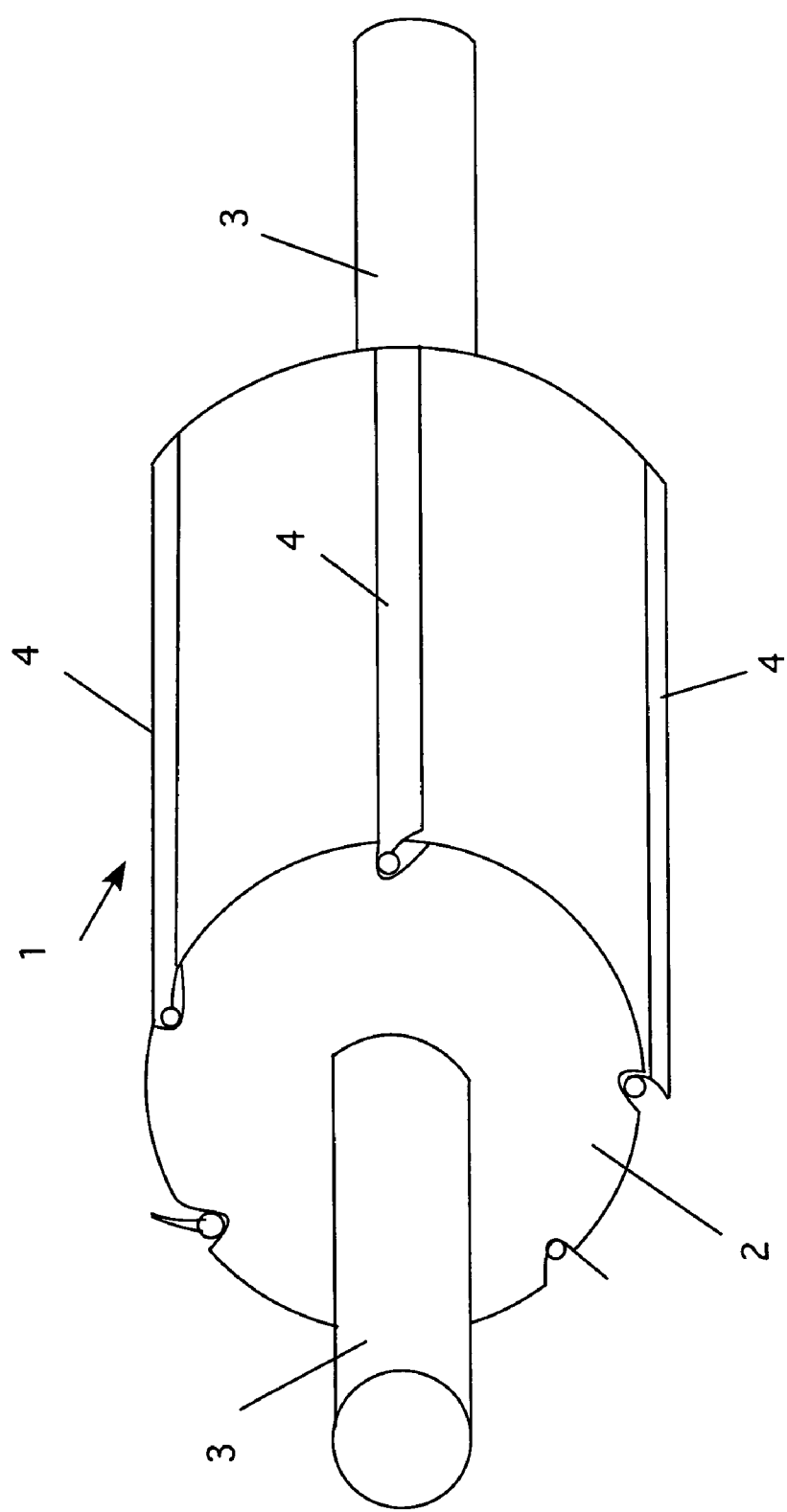
FIG. 1 is a perspective view of the wave cylinder of the invention

Referring now to FIG. 1, a perspective view of the device 1 is shown. The device is made of a lightweight cylinder 2 that is made of Styrofoam or a similar lightweight material. In the preferred embodiment, the Styrofoam is covered with a strong plastic cover that protects the core from damage. The cylinder has a shaft 3, which passes through its center and extends from the ends, as shown. About the perimeter of the cylinder 2, are a number of pivoting blades 4 (see also FIG. 2). FIG. 1 shows a six-blade configuration, although the device can have more blades, as is discussed below. As shown if FIG. 1, the blades 4 run the entire length of the cylinder.

Figure 2:
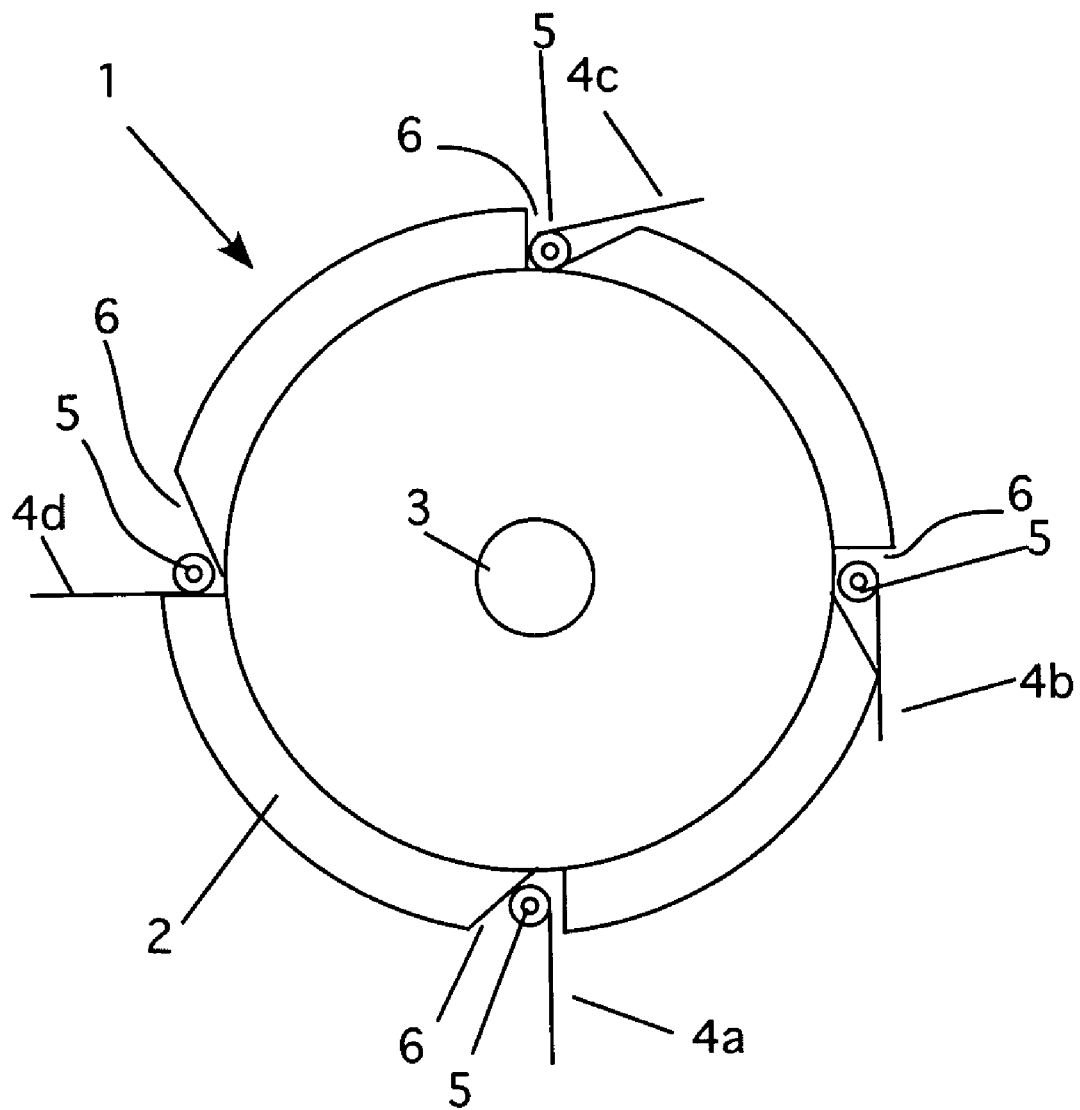
FIG. 2 is an end view of the power cylinder showing four pivoting fins attached to the cylinder.

FIG. 2 shows an end view of the device 1 in a four-blade configuration. Note that each blade 4 is attached to the cylinder 2 using a hinge 5. In this way, the blade can move about as shown in the figure. Note also that the cylinder has a receiver notch 6 formed at each blade location. The shape of the notch is designed restrain the movement of the blade so that it remains in its optimum and most efficient range of motion. For example, for a water flow as indicated by the arrow, the lower blade 4a extends straight down. This allows the maximum force to be applied to the blade. As the water drives the cylinder, the blade 4a rotates to the second position, indicated as blade 4b. Here, the hinge keeps the blade pointing down, but the blade now rests against the side of the cylinder as shown. As the blade moves further around, it reaches the position indicated as 4c. In this position, the blade remains against the cylinder, but is now position almost perpendicular to the blade now in position 4a. As the blade continues, it reaches position 4d. Here, gravity causes the blade to fall into a position perpendicular to the cylinder, which places it in the optimum position for entering the water and beginning the next cycle.

Figure 3:
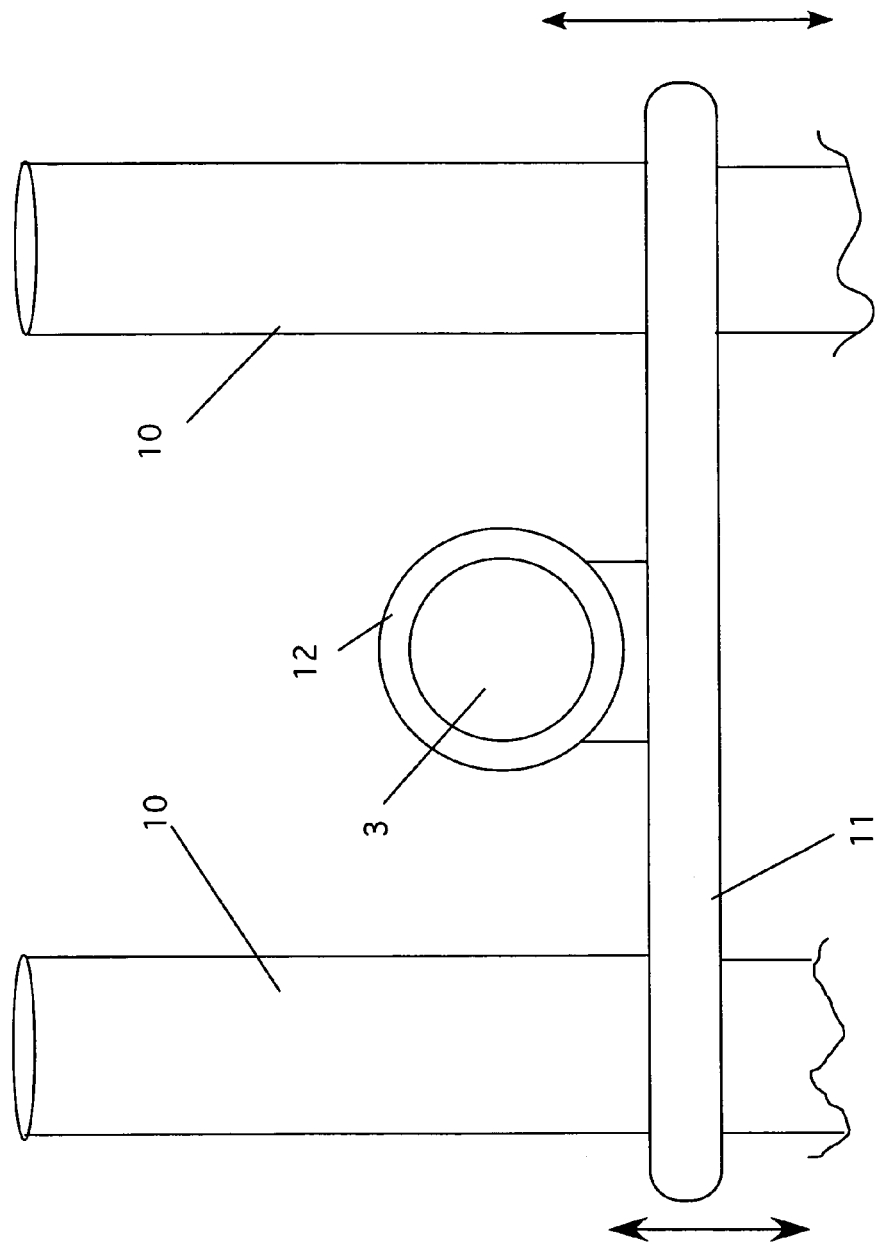
FIG. 3 is a side view of one of the anchoring frames for the system.

FIG. 3 is an end view of the supporting frame. Note that there are two such frames (see, e.g., FIG. 5) to support the cylinder. The frame has two piles 10 that are secured to the bottom (e.g., driven into the bottom or otherwise anchored). The piles 10 are designed to extend above the surface of the water. A platform 11 is attached to the piles 10. The platform 11 has a bearing system 12 secured to it, into which the cylinder shaft is placed. In the preferred embodiment, the platforms 11 are designed to float. Thus, they are slidably attached to the piles so that they are free to rise and fall with the movement of the tide and waves. This action is represented by the double arrows on the figure. In this way, the cylinder always maintains its ideal position in the water.

Figure 4:
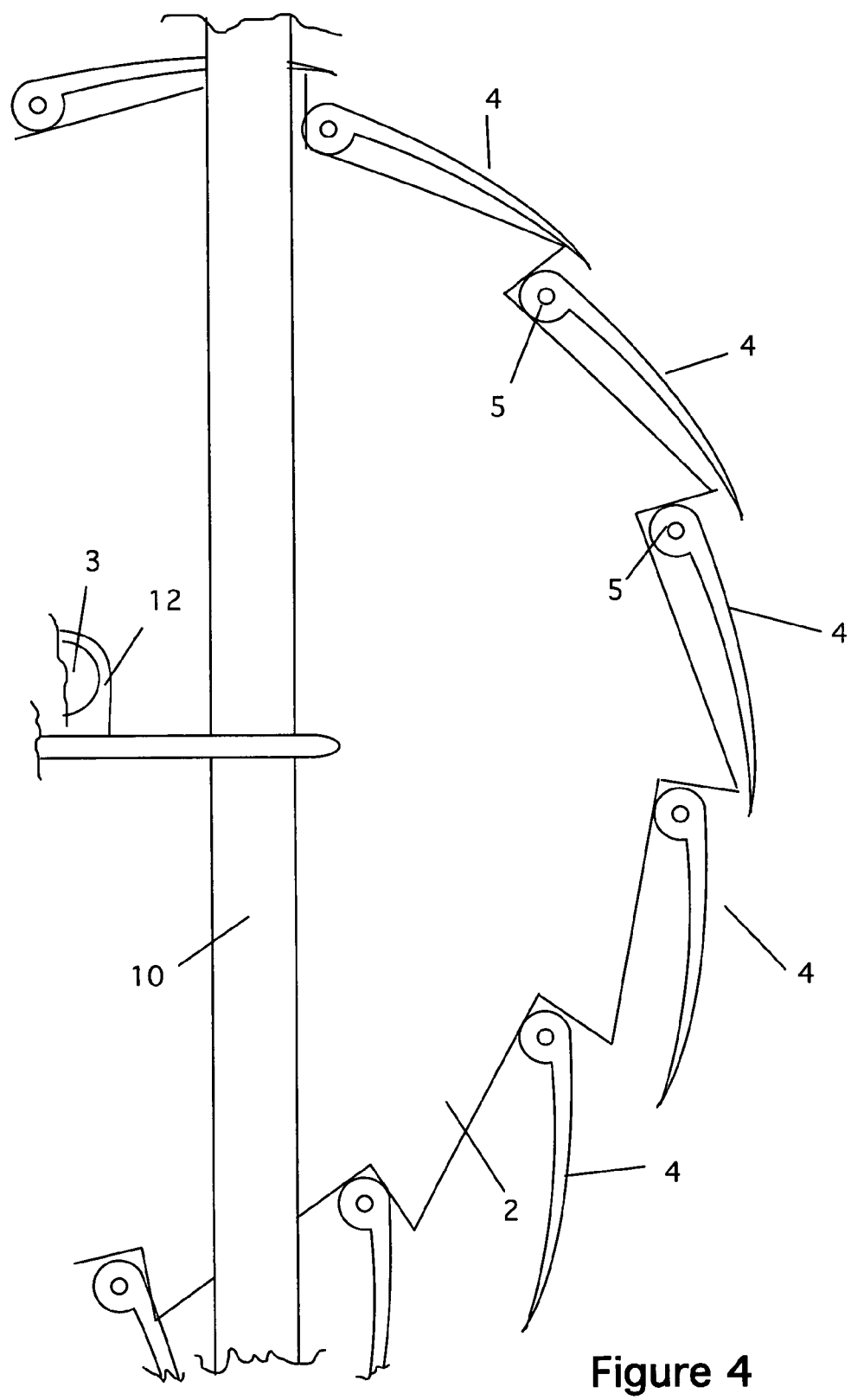
FIG. 4 is an end view showing the power cylinder having an increased number of pivoting wheel fins attached to the paddle wheel cylinder, attached to one of the anchoring frames.

FIG. 4 shows a representative view of the preferred embodiment. Here, a pile 10, and a portion of the platform 11, bearing 12 and shaft 3 are shown. The cylinder 2 has a diameter considerably larger than the shaft, as shown. Here, many blades are shown. FIG. 2 showed four blades for clarity. The preferred embodiment uses many blades. Here, the blades 4 are hinged as before. Also, note that the receiver notches on the cylinder are shaped to accommodate the many blade configuration.

Figure 5:
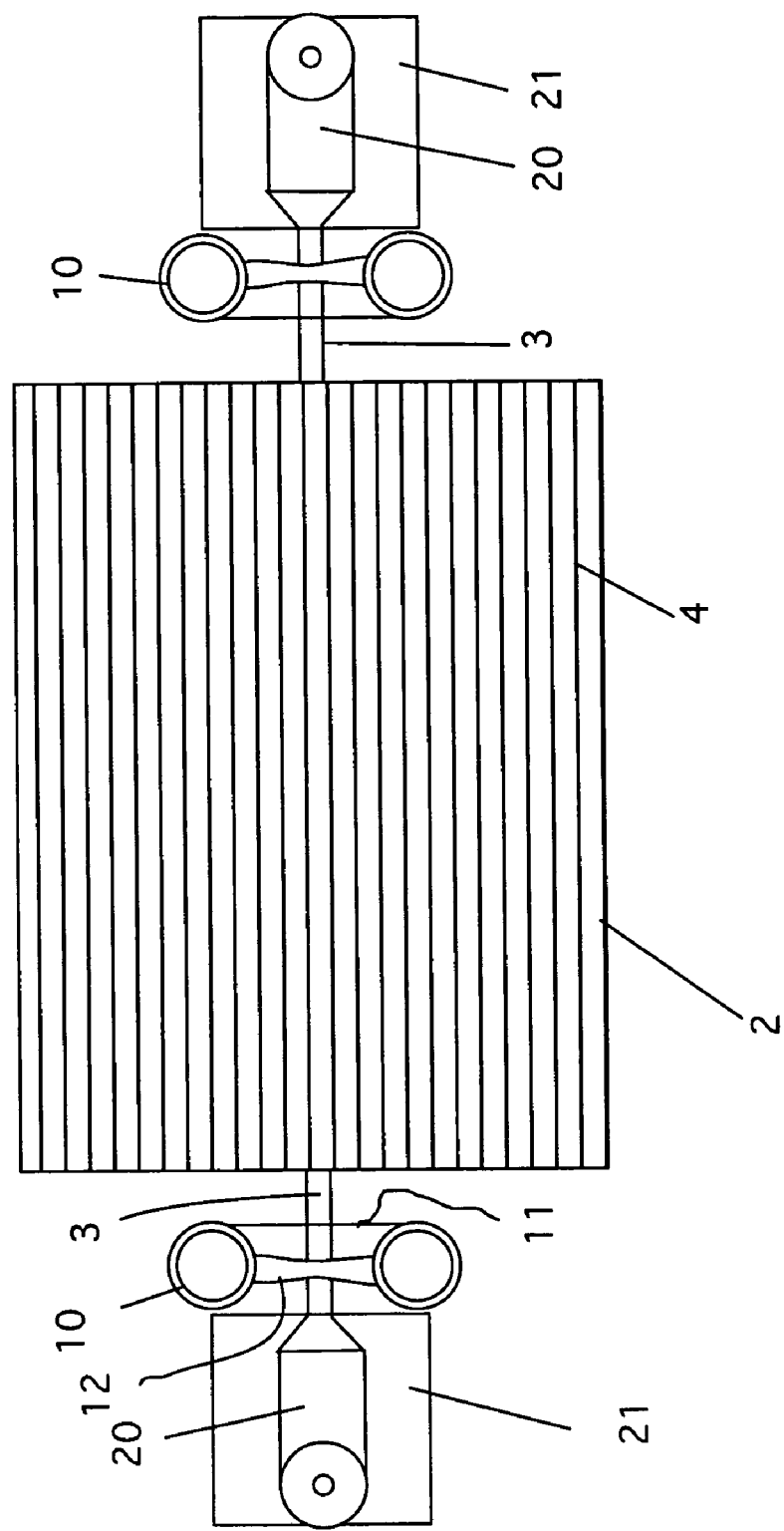
FIG. 5 is a top plan view of the assembled device showing the attached gearboxes and generators and or mechanical equipment.

FIG. 5 is a top view of the preferred embodiment. Here, the large cylinder 2 with many blades 4 is shown with shaft 3 extending out from both ends of the cylinder. The support structures are shown on both sides. Piles 10, the platform 11 and the bearing system 12 are all shown. The figure also shows a pair of generator or other machines 20 that are mounted on platforms 21 as shown. It is possible to have the generators on shore or on platforms in the water. Direct shaft connection to the generators is shown, however, other transmission system, well known in the art, can be used to relocate the generators if desired.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A wave-powered generator comprising:
   a) a cylinder, said cylinder having an outer surface, two sides and a central axis;
   b) a plurality of blades, hingeably attached to said cylinder;
   c) a shaft attached to said cylinder and extending through the central axis of said cylinder and extending outward from cylinder from each of the two sides such that one side of said cylinder has a first shaft portion extending therefrom and the other side of said cylinder has a second shaft portion extending therefrom;
   d) a first support frame positioned on one side of cylinder and having a bearing means for supporting said first shaft portion;
   e) a second support frame being oppositely disposed from said first support frame and being positioned on the other side of cylinder, said second support frame having a bearing means for supporting said second shaft portion; and
   f) a generator operably attached to said first shaft portion;
   wherein the cylinder is filled with Styrofoam.

2. A wave-powered generator comprising:
   a) a cylinder, said cylinder having an outer surface, two sides and a central axis;
   b) a plurality of blades, hingeably attached to said cylinder;
   c) a shaft attached to said cylinder and extending through the central axis of said cylinder and extending outward from cylinder from each of the two sides such that one side of said cylinder has a first shaft portion extending therefrom and the other side of said cylinder has a second shaft portion extending therefrom;
   d) a first support frame positioned on one side of cylinder and having a bearing means for supporting said first shaft portion;
   e) a second support frame being oppositely disposed from said first support frame and being positioned on the other side of cylinder, said second support frame having a bearing means for supporting said second shaft portion; and
   f) a generator operably attached to said first shaft portion;
   wherein the cylinder has a plurality of notches formed in said outer surface and further wherein said plurality of notches are in substantial alignment with the plurality of blades.

3. A wave-powered generator comprising:
   a) a cylinder, said cylinder having an outer surface, two sides and a central axis;
   b) a plurality of blades, hingeably attached to said cylinder;
   c) a shaft attached to said cylinder and extending through the central axis of said cylinder;
   d) a first support frame, having at least one post, positioned on one side of cylinder and having a platform, slidably engaged on said post;
   e) a first bearing means for supporting said shaft, secured to said platform;
   f) a second support frame being oppositely disposed from said first support frame and being positioned on the other side of cylinder, said second support frame having a platform, slidably engaged on said post;
   g) a second bearing means for supporting said shaft, secured to said platform on said second post; and
   f) a generator operably attached to said shaft;
   wherein the cylinder has a plurality of notches formed in said outer surface and further wherein said plurality of notches are in substantial alignment with the plurality of blades.

* * * * *